Patented May 28, 1940

2,202,066

UNITED STATES PATENT OFFICE 2,202,066

COLORATION OF TEXTILE MATERIALS

Herbert Platt, Cumberland, Md., assignor to Celanese Corporation of America, a corporation of Delaware No Drawing. Application February 3, 1938, Serial No. 188,441

10 Claims. (Cl. 8—63)

This invention relates to the coloring of textile materials made of or containing organic derivatives of cellulose such as cellulose esters and cellulose ethers, and relates more particularly to the coloring of such materials by printing or stencilling methods.

As is well known, cellulose acetate or other organic esters of cellulose and cellulose ethers have comparatively limited affinities for a number of well known classes of coloring matters, for example, the acid wool colors, direct cotton colors, any of the vat colors, pigments and also some of the basic dyestuffs. This lack of affinity is especially noticeable in the case of applying the coloring matters by printing or stencilling methods. The term "coloring matters" is hereinafter used in the sense of including not only dyestuffs but also pigments.

It is an object of this invention to produce fast colorations on materials comprising cellulose esters or cellulose ethers with the aid of coloring matters which, while they have an affinity for the cellulose ester or cellulose ether material, are insoluble or difficultly soluble in water.

Another object of this invention is the production of a coloring matter composition suitable for direct printing, stencilling, etc. on textile materials containing organic derivatives of cellulose, which imparts to the materials a color which is faster to steaming and washing than has been heretofore obtainable with the same coloring matter.

A further object of this invention is the preparation of a printing paste in which the coloring matter compound is more evenly and finely dispersed in the gum or other carrier therefor.

Other objects of this invention will appear from the following detailed description and the appended claims.

It has now been found that if such water-insoluble coloring matters are applied to the cellulose derivative materials in the presence of an organic liquid exerting at least a solvent action on the coloring matters, commercially valuable colorations are obtained. Preferably such organic liquids have a relatively high boiling point.

In accordance with the process of the present invention I apply the coloring matter composition together with the organic liquid to the fabric or other textile material and dry the treated material at an elevated temperature. The thus treated textile material is then subjected to a steaming operation and finally dried. The present process is of considerable advantage in the printing and stencilling of cellulose ester and cellulose ether materials with dispersed insoluble colors, for example, the SRA, the Cellitone and Duranol colors. These dispersed insoluble colors may, for example, be of the azo series, of the anthraquinone series such as amino and amino-hydroxy anthraquinones, and their alkyl or oxy-alkyl derivatives, and nitrated compounds, as for example, nitro-diarylamines.

I have found that the mono-laurate of diethylene glycol known in the art and hereinafter designated as diglycol laurate may with great advantage be employed with the process of this invention. This organic liquid is high boiling and non-volatile and therefore does not evaporate or thicken on ageing. The diglycol laurate is miscible with glycerine, ethylene glycol and diethylene glycol in certain proportions, and also with the aqueous paste preparation with which it is incorporated. The use of diglycol laurate has the advantage over the organic liquids heretofore employed for similar purposes in that it is practically free from odor and yields purer and brighter colors. Moreover, this compound is very easy to obtain, is relatively inexpensive and only a small quantity of the same, namely, on the order of about 3%, need be employed. In the printing with SRA dyestuffs, for example, diglycol laurate is a particularly valuable addition to the SRA dyestuff printing paste since it has the property of dissolving the dyestuff and keeping it emulsified and dispersed. This results in the printing paste yielding prints which are free from specks and which are penetrated more completely into the organic derivative of cellulose materials being treated.

The materials to be treated in accordance with the present invention may consist of or contain any ester or ether of cellulose, for example cellulose acetate, cellulose formate, cellulose propionate, cellulose butyrate, cellulose nitro-acetate, ethyl cellulose, methyl cellulose and benzyl cellulose, the said cellulose derivatives being present alone or in admixture with each other or in admixture with other fibers, for instance, cotton, reconstituted cellulose, natural silk or wool. Differential effects are of course obtainable on fabrics containing such other fibers in accordance with the affinity of the said fibers for the dyestuffs or coloring matters applied.

Moreover, as has already been stated, certain basic dyestuffs present difficulties in their application to the goods, particularly when applied by printing methods. The present invention envisages the application, together with the organic liquid referred to of such dyestuffs, as, for example, 2:4-dinitro-4-hydroxy diphenylamine (yellow); benzene-azo-benzene-azo-phenol (yellow); alpha-ethanol-amino-anthraquinone (red); methylated diamino-anthrarufin (blue); 1:4-diethanolamine-5-oxy-anthraquinone (green); phenol-azo-phenyl-methyl-pyrazolone (yellow); paranitro-benzene-azo-dioxy-ethyl-metachloraniline (scarlet).

Printing pastes, stencilling preparations or the like may contain any other desired ingredients, for example, a thickener of any kind such as gum arabic, starch, British gum or soluble cellulose ethers or cellulose esters, and any other desired assistants, for example, ethylene thio-diglycol, diethylene glycol, glycol, etc.

The following example illustrates the invention but it is not to be considered as limiting it in any way:

Example

A fabric consisting of cellulose acetate yarn is printed with a paste made as follows:

| | Parts by weight |
|---|---|
| SRA Print Red VI X | 8 |
| Water | 19 |
| Gum tragacanth | 65 |
| Glycerine | 5 |
| Diglycol laurate | 3 |

After printing the fabric is subjected to the action of heat until dried. The printed fabric is then steamed for one-half hour at 5 pounds pressure, soaped lightly and dried. The prints obtained are free from specks and penetrate more completely into the fabric.

It is to be understood that the foregoing detailed description is merely given by way of illustration and that many variations may be made therein without departing from the spirit of my invention.

Having described my invention, what I desire to secure by Letters Patent is:

1. In the process of locally coloring materials comprising organic derivatives of cellulose with a composition containing a dyestuff, the step which comprises incorporating diglycol laurate with the dyestuff.

2. In the process of locally coloring materials comprising organic derivatives of cellulose with a composition containing a water-insoluble dyestuff, the step which comprises incorporating diglycol laurate with the dyestuff.

3. In the process of locally coloring textile materials comprising cellulose acetate with a composition containing a water-insoluble dyestuff, the step which comprises incorporating diglycol laurate with the composition.

4. In the process of locally coloring textile materials comprising organic derivatives of cellulose with a composition containing a water-insoluble dyestuff, the step which comprises incorporating diglycol laurate with the composition, the diglycol laurate being present in an amount equal to about 3% by weight of the composition.

5. In the process of locally coloring textile materials comprising cellulose acetate with a composition containing a water-insoluble dyestuff, the step which comprises incorporating a diglycol laurate with the composition, the diglycol laurate being present in an amount equal to about 3% by weight of the composition.

6. A printing paste for use in coloring textile materials comprising an organic derivative of cellulose, said paste containing a dyestuff, a thickening agent, a softening agent, and diglycol laurate.

7. A printing paste for use in coloring textile materials comprising cellulose acetate, said paste containing a dyestuff, a thickening agent, a softening agent, and diglycol laurate as a solvent and dispersing agent for the dyestuff.

8. A printing paste for use in coloring textile materials comprising an organic derivative of cellulose, said paste containing a water-insoluble dyestuff, a gum, glycerine, and diglycol laurate as a solvent and dispersing agent for the dyestuff.

9. A printing paste for use in coloring textile materials comprising an organic derivative of cellulose, said paste containing a water-insoluble dyestuff, a gum, glycerine, and diglycol laurate as a solvent and dispersing agent for the dyestuff, the diglycol laurate being present in an amount equal to about 3% by weight of the printing paste.

10. A printing paste for use in coloring textile materials comprising cellulose acetate, said paste containing a water-insoluble dyestuff, a gum, glycerine, and diglycol laurate as a solvent and dispersing agent for the dyestuff, the diglycol laurate being present in an amount equal to about 3% by weight of the printing paste.

HERBERT PLATT.